United States Patent
Ross et al.

(10) Patent No.: US 10,731,428 B2
(45) Date of Patent: Aug. 4, 2020

(54) MULTI-STAGE DRILLING WASTE MATERIAL RECOVERY PROCESS

(71) Applicant: RECOVER ENERGY SERVICES INC., Calgary, AB (CA)

(72) Inventors: Stan Ross, Cochrane (CA); Paul Sudlow, Calgary (CA)

(73) Assignee: RECOVER ENERGY SERVICES INC., Calgary, AB (CA)

( * ) Notice: Subject to any disclaimer, the term of this patent is extended or adjusted under 35 U.S.C. 154(b) by 488 days.

(21) Appl. No.: 15/448,029

(22) Filed: Mar. 2, 2017

(65) Prior Publication Data

US 2017/0298703 A1    Oct. 19, 2017

Related U.S. Application Data

(60) Provisional application No. 62/324,622, filed on Apr. 19, 2016.

(51) Int. Cl.
| | |
|---|---|
| *E21B 21/06* | (2006.01) |
| *B01D 3/00* | (2006.01) |
| *B01D 21/26* | (2006.01) |
| *F26B 3/18* | (2006.01) |
| *F26B 5/08* | (2006.01) |

(52) U.S. Cl.
CPC .............. *E21B 21/066* (2013.01); *B01D 3/00* (2013.01); *B01D 21/26* (2013.01); *E21B 21/065* (2013.01); *F26B 3/18* (2013.01); *B01D 21/262* (2013.01); *F26B 5/08* (2013.01)

(58) Field of Classification Search
None
See application file for complete search history.

(56) References Cited

U.S. PATENT DOCUMENTS

| | | | | |
|---|---|---|---|---|
| 4,139,462 A | * | 2/1979 | Sample, Jr. ........... | E21B 41/005 210/774 |
| 5,090,498 A | * | 2/1992 | Hamill .................. | B01D 36/04 175/206 |

(Continued)

FOREIGN PATENT DOCUMENTS

WO    03/102359    12/2003

*Primary Examiner* — Robert J Popovics
(74) *Attorney, Agent, or Firm* — Greenblum & Bernstein, P.L.C.

(57) ABSTRACT

A process for removing free liquids from oil base mud contaminated drill cuttings waste. A process is described wherein a high gravity centripetal separator and low temperature thermal process are cooperatively used to enhance the mechanical and thermal separation methods, resulting in improved efficiency of the hydrocarbon and water removal process. A process is also described wherein the oil base mud contaminated drill cuttings waste is heated to strip volatile constituents and excess water from the oil base mud contaminated drill cuttings to further enhance the mechanical and thermal separation methods resulting in improved efficiency of the hydrocarbon and water removal process. A less expensive process is also described where the oil base mud contaminated drill cuttings waste is heated to strip volatile constituents and excess water from the oil base mud contaminated drill cuttings to further enhance the recoverable liquids phase during mechanical separation. A conventional stripping process for oil base mud is also utilized.

11 Claims, 6 Drawing Sheets

(56) References Cited

U.S. PATENT DOCUMENTS

| | | | | |
|---|---|---|---|---|
| 5,256,289 | A | * | 10/1993 | Cope .......................... B04B 3/04 |
| | | | | 210/369 |
| 8,668,634 | B2 | * | 3/2014 | Wick ......................... B03B 9/02 |
| | | | | 494/13 |
| 2016/0045841 | A1 | * | 2/2016 | Kaplan ................ B01J 19/0093 |
| | | | | 429/49 |
| 2017/0298703 | A1 | * | 10/2017 | Ross ........................ B01D 3/00 |

* cited by examiner

201  
Unstabilized drill cuttings

202  
Sawdust (stabilizing material)

203  
Stabilized drill cuttings

MULTI-STAGE DRILLING WASTE MATERIAL RECOVERY PROCESS

CROSS-REFERENCE TO RELATED APPLICATIONS

This application claims the benefit under 35 U.S.C. § 119(e) of U.S. Provisional Application Ser. No. 62/324,622 filed Apr. 19, 2016, the disclosure of which is expressly incorporated by reference herein in its entirety.

TECHNICAL FIELD

The field of art to which this invention generally pertains is the processing of drill cuttings waste.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies such as thermal extraction, solvent washes, mechanical separators, and the increasing cost of drilling fluids, the ability to, and benefits of, reclaiming materials from the drill cuttings waste, such as various components of the drilling fluids, is increasing.

Accordingly, there is a constant search for new technologies and improvements to existing technologies to increase the efficiency and effectiveness of reclaiming processes.

BRIEF SUMMARY

A process for removing hydrocarbon and water contamination from a first phase oil base mud contaminated drill cuttings containing liquids and solids, and recovering liquids in a multi-stage separation process is described, including placing the first phase oil base mud contaminated drill cuttings in a container and managing the flow of the first phase oil base mud contaminated drill cuttings into and out of the container to a substantially consistent ratio of liquids phase to solids phase; conveying the first phase oil base mud drill cuttings into a high gravity centripetal cuttings separator to create a second solids phase with less water and hydrocarbon contamination and a third liquids phase with an approximately equal ratio of liquids to solids; conveying the said third liquids phase with an approximately equal ratio of liquids to solids into a low temperature thermal process utilizing stationary reactor walls and high speed rotating paddles, the solids in the third phase causing friction between the stationary reactor walls and high speed rotating paddles of the low temperature thermal process, and the friction generating heat energy causing evaporation of the liquids portion of the third phase into a fourth vapor phase and a sixth solids phase; condensing the fourth vapor phase into a fifth liquid phase comprising water and/or hydrocarbons, and collecting the fifth liquid phase; and mixing the sixth solids phase with the second solids phase to form a seventh mixed solids phase; resulting in enhanced liquids and solids recovery.

Additional embodiments include: the process described above where the high gravity centripetal cuttings separator exerts greater than 400 gravitational forces on the oil base mud contaminated drill cuttings waste; the process described above where the high gravity centripetal cuttings separator exerts greater than 1000 gravitational forces on the oil base mud contaminated drill cuttings waste; the process described above where the high gravity centripetal cuttings separator is operated to obtain maximum dryness of the second solids phase; the process described above where the first phase oil base mud contaminated drill cuttings is heated to a temperature of at least 20° C. at 0 PSIG (pounds per square inch gravity); the process described above where the heating is provided by natural gas or recycled heat energy from the condensing of the fourth vapor phase; the process described above where the centripetal cuttings separator removes greater than 50% by volume of the liquids phase from the first oil base mud contaminated drill cuttings phase; the process described above where the liquids phase comprises at least free water, hydrocarbons, and/or emulsified water; the process described above where the enhanced liquids and solids recovery includes an increase of drill cuttings waste throughput of the low temperature thermal process by greater than 25% and/or cleaner solids recovery; the process described above where the enhanced liquids and solids recovery includes an increase of drill cuttings waste throughput of the low temperature thermal process by greater than 50% and/or cleaner solids recovery containing less hydrocarbon contamination; and the process described above where the enhanced liquids and solids recovery includes an increase of drill cuttings waste throughput of the low temperature thermal process by up to 100% and/or cleaner solids recovery.

A process for removing hydrocarbons and water from a first phase oil base mud contaminated drill cuttings and recovering liquids in a multi-stage separation process is also described, including heating the first phase oil base mud contaminated drill cuttings to remove at least a portion of undesired liquid constituents as a ninth vapor phase and recondensing the ninth vapor phase in an operatively connected condenser thereby forming a twelfth liquids phase, and forming a heated eight phase oil base mud contaminated drill cuttings containing a liquids portion and a solids portion; conveying the heated eight phase of oil base mud contaminated drill cuttings into a high gravity centripetal cuttings separator to create a second solids phase containing less water and hydrocarbons contamination than the eight phase, and a third liquids phase with less solids than the eight phase; conveying the third liquids phase to a fluid stripping process removing low gravity solids, producing a thirteenth phase of low gravity solids with reduced liquids and a tenth liquids phase with substantially no solids; conveying the second solids phase and thirteenth low gravity solids phase to a low temperature thermal process utilizing stationary reactor walls and high speed rotating paddles, the interaction between the solids of the second and thirteenth phase and the stationary reactor walls and high speed rotating paddles generating at least a portion of the heat energy necessary to cause evaporation of the liquids of the second and thirteenth phase into a fourth vapor phase; condensing the fourth vapor phase into a fifth liquid phase comprising water and/or hydrocarbons, and collecting the fifth liquid phase; and collecting the tenth liquids phase from the fluid stripping process which is optionally stored in a storage tank or mixed with the fifth liquids phase to create a eleventh liquids phase for use in an oil base mud drilling fluid; resulting in enhanced liquids and solids recovery.

Additional embodiments include: the process described above where the ninth phase of undesired liquid constituents removed comprise at least a portion of water, and/or at least a portion of benzene, and/or at least a portion of toluene, and/or at least a portion of ethylbenzene, and/or at least a portion of xylene from the first phase; the process described above where the undesired liquid constituents removed include liquids with a closed cup flash point of less than 60° C.; the process described above where the undesired liquid constituent removed includes a gas or liquid containing fewer than nine carbon atoms per molecule; the process described above where the viscosity of the liquids portion of the eight phase is less than 1.0 cP (centipoise) as a result of the said heating; the process described above where the viscosity of the liquids portion of the eight phase is less than 0.75 cP as a result of the said heating; the process described above where the high gravity centripetal cuttings separator exerts greater than 400 gravitational forces on the oil base mud contaminated drill cuttings; the process described above where the high gravity centripetal cuttings separator exerts greater than 1000 gravitational forces on the oil base mud contaminated drill cuttings; the process described above where the high gravity centripetal cuttings separator is operated to achieve a minimum amount of solids in the third liquids phase; the process described above where the heating of the first phase of oil base mud contaminated drill cuttings includes the use of a holo-flight heating screw; the process described above where the heating of the first phase of oil base mud contaminated drill cuttings includes the use of a conveyor within a jacketed heating trough; the process described above where the heating of the first phase of oil base mud contaminated drill cuttings includes the use of a tank filled with hot oil containing 10 to 30 carbon atoms per molecule; the process described above where the heating of the first phase of oil base mud contaminated drill cuttings includes the use of a tank filled with hot oil containing 10 to 25 carbon atoms per molecule; the process described above where the heating of the first phase of oil base mud contaminated drill cuttings includes the use of a tank filled with hot oil containing 11 to 20 carbon atoms per molecule; the process described above where the enhanced liquids and solids recovery includes an increase of drill cuttings waste throughput of the low temperature thermal process by greater than 25% and/or cleaner solids recovery; the process described above where the enhanced liquids and solids recovery includes an increase of drill cuttings waste throughput of the low temperature thermal process by greater than 50% and/or cleaner solids recovery; the process described above where the enhanced liquids and solids recovery includes an increase of drill cuttings waste throughput of the low temperature thermal process by up to 100% and/or cleaner solids recovery; and the process described above where the heating of the first phase of oil base mud contaminated drill cuttings is provided by natural gas and/or recycled heat energy from the low temperature thermal process.

A method of treating a first phase oil base mud contaminated drill cuttings phase is also described including heating the first phase oil base mud contaminated drill cuttings in a heating tank and causing constituents with a lower boiling point than the boiling points of the base oil portion of the oil base mud, to at least partially vaporize and leave the vapor tight heating tank as a ninth vapor phase where the vapors are recondensed in an operatively connected condenser and collected as a separate twelfth liquids phase, and further processing the eight phase of oil base mud contaminated drill cuttings phase in a centripetal cuttings separator to create a liquids phase containing less solids than the first phase oil base mud contaminated drill cuttings, and a solids phase containing less liquids than the first phase oil base mud contaminated drill cuttings, resulting in enhanced liquids which are at least partially void of water, benzene, toluene, ethylbenzene and xylene and constituents containing fewer than nine carbon atoms per molecule.

These, and additional embodiments, will be apparent from the following descriptions.

Figure 3:
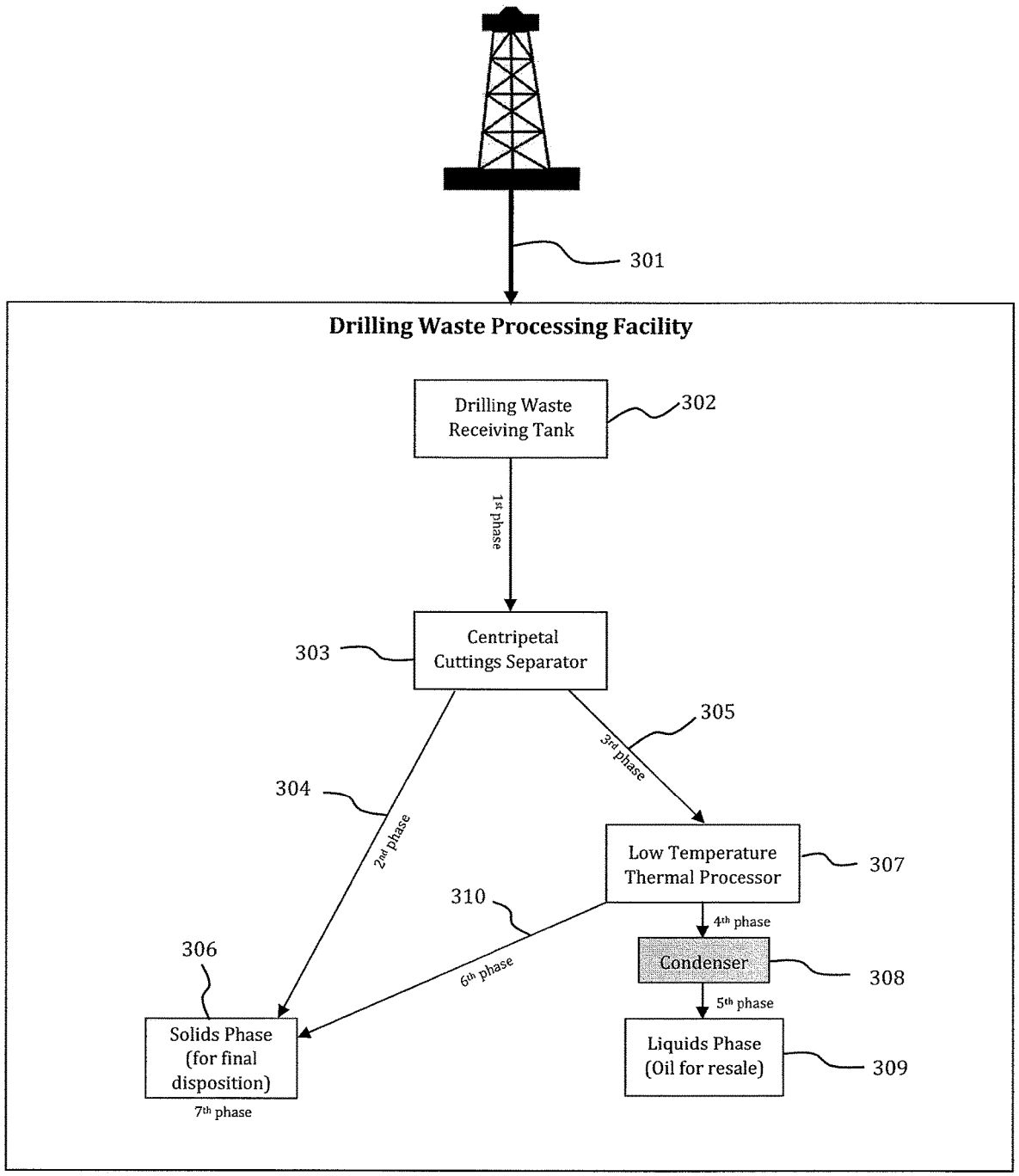

The FIG. 3 shows a flow chart of an embodiment of the methods described herein. Specifically, the use of a high gravity centripetal separator to remove free liquids prior to employing the use of a Low Temperature Thermal processor to clean the drill cuttings waste, with greater efficiency.

Figure 4:
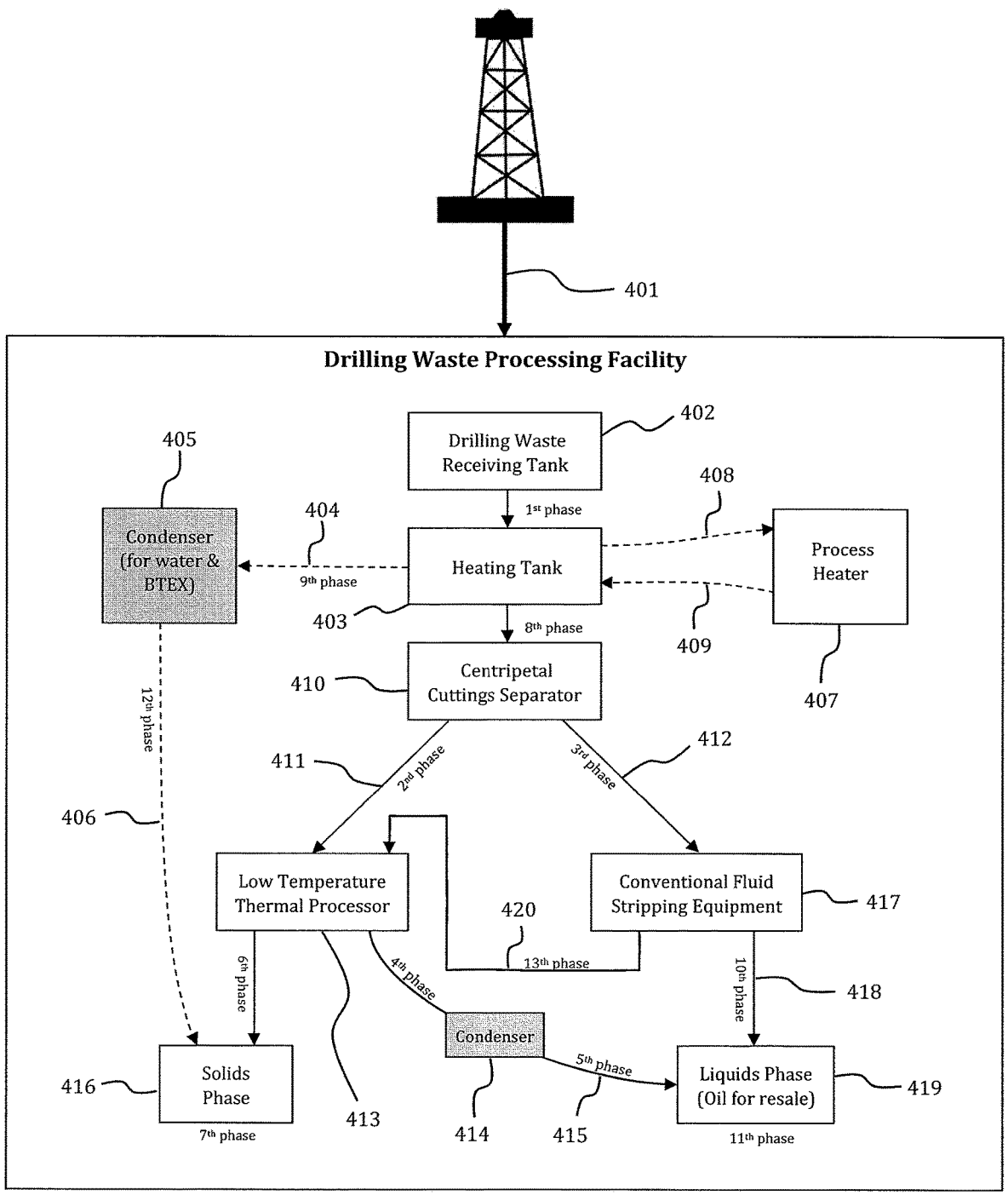

FIG. 4 shows a flow chart of an embodiment of the methods described herein. Specifically, by adding less expensive heat energy to the liquid containing drill cuttings in an effort to cause at least a portion of the liquids phase to evaporate prior to employing the use of a high gravity centripetal separator to remove additional free liquids. Thereafter, the flow chart illustrates the use of a Low Temperature Thermal processor to treat the concentrated liquids phase and solids phase recovered from the high gravity centripetal separator.

Figure 5:
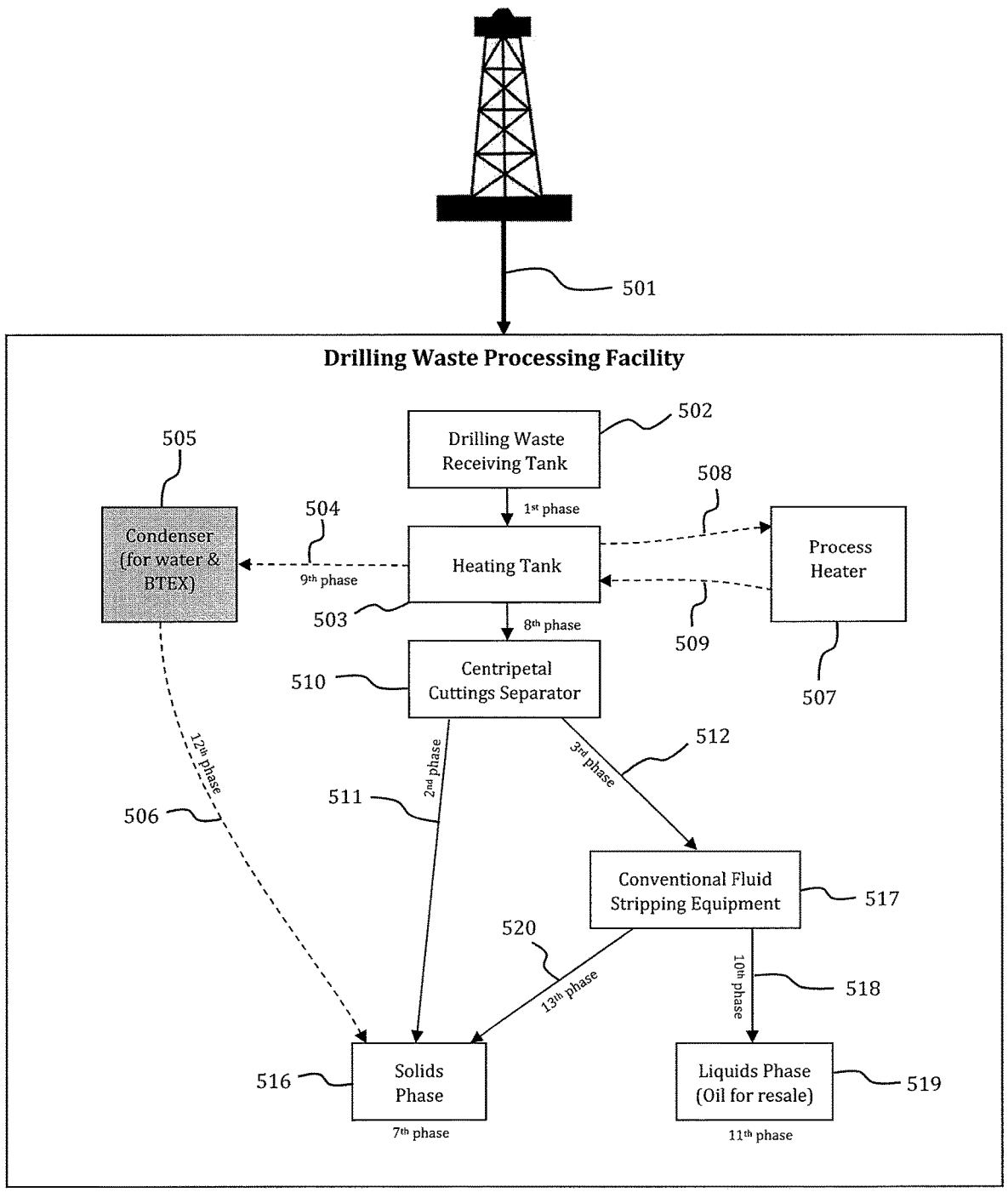

FIG. 5 shows a flow chart of an embodiment of the methods described herein. Specifically, by adding less expensive heat energy to the liquid containing drill cuttings in an effort to cause at least a portion of the liquids phase to evaporate, prior to employing the use of a high gravity centripetal separator to remove additional free liquids. This is a very low cost method of recovering an enhanced liquids phase.

Figure 6:
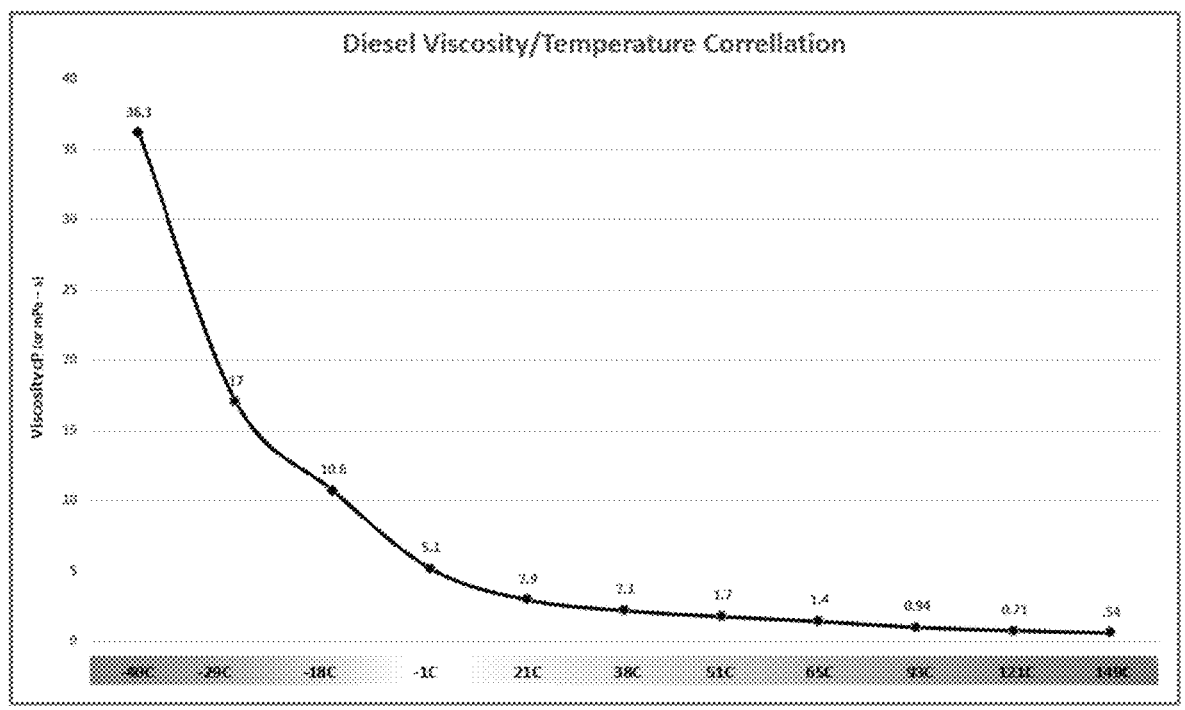

FIG. 6 is a table to illustrate the change in viscosity of diesel fuel as the temperature rises from cooler to hotter.

Figure 7:
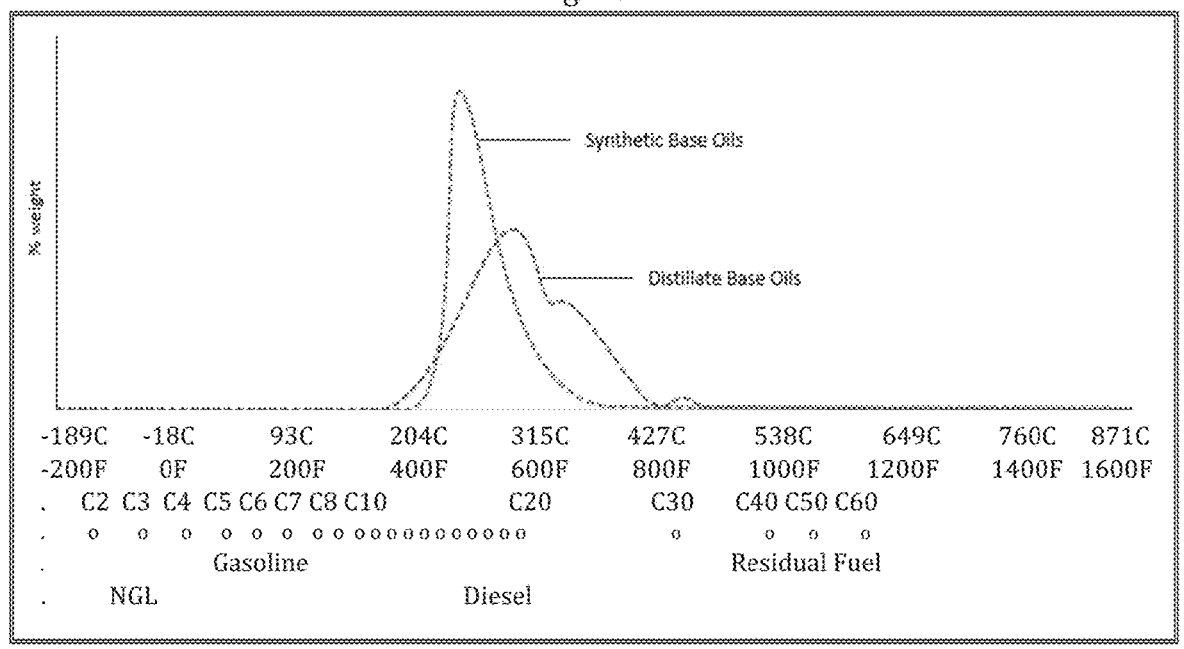

FIG. 7 illustrates the normal boiling point range of carbon fractions, and various hydrocarbon fuels, their carbon fraction makeup, and the same for synthetic and distillate base oils, used to blend oil base mud.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

The following terminology is included for ease of understanding of the reader:

Drilling fluid—used in the drilling industry to carry the drill cuttings/solids phase (rock, clay, shale, etc.) broken up by the drill bit out of the well bore. Drilling fluid (also known as drilling mud) consists of a base fluid with additives which can include liquids or solids or both, which give the drilling fluid properties necessary for effective use as a drilling mud.

Oil based mud—(OBM) also known as Invert, is a type of drilling fluid that uses oil as the base ingredient and it typically consists of a mixture of oil, emulsified water and drilling mud additives which might be solids or liquids or both. OBM's typically consist of distillates or synthetic oil as the base fluid. Conversely, water based mud is a drilling fluid that uses water as the base ingredient, mixed with liquids or solids or both. Common types of water base muds are gel-chem mud systems, brine mud systems or polymer mud systems.

Low Gravity Solids—(LGS) are typically less than 20 microns in size and consist of drilling mud additives or formation solids. Formation solids begin as larger drill cutting pieces for example, as large as 2 centimeters in diameter, of which a portion of the larger pieces become broken or ground down to less than 20 microns by the time they arrive at surface.

Viscosity is best understood as the thickness of a fluid. For example, water has relatively low viscosity, whereas a milkshake has a higher viscosity.

Rheology is the science of explaining liquid flow. One of the important rheology properties of drilling mud is the 'yield point', or the carrying capacity of the fluid. A small solid dropped in a glass of water demonstrates a fluid with no yield point, because the small solid will drop regardless of its size. The same size solid in a milkshake may not drop at all because the force of gravity may not be strong enough to break the yield point of the milk shake. If it is heavy enough to exceed the yield point of the fluid it will drop more slowly than the same size solid in water due to the higher viscosity of the milk shake. Drilling mud is typically modeled as a Bingham plastic. Bingham Plastics are liquids that behave like a solid, up to a particular amount of shear stress, when they behave more like a liquid than a solid; this is known as the yield point of the fluid.

The temperatures referenced herein are at 0 PSIG. If one decides to use pressures above or below 0 PSIG, one would know to, and would adjust the temperatures, accordingly, to obtain the similar and desired results described herein.

With the significant cost of drilling muds, there has been research and development to most effectively recover as much of the drilling mud as possible, by using solids separating devices or fluids rehabilitation devices. Such systems include shale shakers, centrifuges, centripetal dryers, thermal extraction systems or diluent washing systems.

Typically, the drill cuttings are carried up the wellbore by the drilling mud and passed over a shale shaker(s) to remove a substantial portion of the drilling mud. Shale shakers are considered the first line of defense on a drilling rig, for recapturing drilling fluid that would otherwise be lost to the drill cuttings. They are a highly effective mechanism for bulk liquids recovery and very inexpensive when compared to other conventional forms of solids control, like that of centrifuges for example. While all shale shakers operate on the same basic principal, they do come in a variety of models, which offer differing gravitational forces, coarse to very fine screen sizes, differing vibratory motions, and as few as one screen, or as many as four, on one or more screen bed elevations.

Shale shakers apply force, usually measured in terms of gravitational forces, ranging between four to eight times greater than earth's gravity. The principals behind a vibratory screen is to create a bed where the solids and liquids phase "bounce", causing the liquids phase to yield under the stresses of the gravity and shaker forces. The yield point is the point where the Bingham Plastic liquids phase transitions from behaving like a solid, to acting as a liquid. Acting as a liquid provides an opportunity for the liquids phase to be thrown from the solids phase, and drop through the low micron screen of the vibratory bed. The liquids phase can then be returned directly to a processing tank, or be collected in an attached hopper or hose, and redirected to another process such as that of centrifuges, hydro cyclones, or membranes, for further fluids rehabilitation. Additional fluids rehabilitation is required because conventional shale shakers are a good mechanism to remove a substantial amount of liquids from the solids. However, this fluid typically contains small micron, high or low gravity solids that would otherwise travel through the porosity of the vibratory screen, rather than be caught on the upper side of the screen with the larger solids. Typically, shale shakers are only effective at obtaining a drill cuttings dryness of 10% to 25% by weight.

Centripetal cuttings dryers are sometimes employed to recover more drilling mud than a drilling rig shale shaker is capable of. Cuttings dryers can include vertical cuttings dryers or enhanced decanter centrifuges and are generally capable of producing a cuttings dryness of 5% to 25% by weight. However, the liquids phase recovered in a cuttings dryer is typically in need of substantial fluids rehabilitation. Regardless of the mechanical separation method employed, for example a shale shaker or cuttings dryer, the accepted and effective method of low gravity solids reductions from the drilling mud is to employ a horizontal decanter centrifuge.

Horizontal decanter centrifuges are commonly used to remove the greater than 5 micron size solids that otherwise pass through the shale shaker screens. A typical drill site decanter can exert gravitational forces in excess of 1000 times that of Earth's gravity, and as much as 3000 times Earth's gravity force. These forces are capable of removing substantial volumes of low gravity solids, also known as drilled solids, before the low micron/low gravity solids volume can accumulate and become problematic to the drilling operation. Decanters have many designs and operating parameters including shorter or longer beach lengths for example, or shallow or deeper weir settings to facilitate longer fluids retention or a dryer solids discharge. It is up to the designers and operators of the decanter to balance the operating parameters against the specific needs of the drill site.

As drilling mud is fed into a rotating horizontal decanter-type centrifuge, the centripetal forces exerted by the rotating bowl on the wet cuttings force them to the inside surface of the bowl. The centripetal force on the cuttings increases with the rotational speed of the bowl. At sufficient rotational speed, the centripetal forces on the cuttings will be high enough to overcome the yield strength of the fluid and the large solids will tend to shed fluid at a rate that is slowed by the viscosity of the fluid. If the rotational acceleration of the bowl is not fast enough, the centripetal force on the smallest solid particle within the drilling mud will not be high enough to break the yield strength of the drilling fluid and the low micron solids will remain in the fluid regardless of how long the fluid remains in the decanter. But if the rotational acceleration of the bowl is high enough to apply a sufficient centripetal force on the smallest solids within the drilling mud for it to break the yield strength of the fluid, the smallest solids will sink within the fluids. The rate they sink at is governed by Stokes' law which predicts that a particle will sink (or float) and accelerate up to the speed (terminal velocity) where the exerted forces causing the particle to move are equal to the viscous (or drag) forces that oppose the motion.

Figure 1:
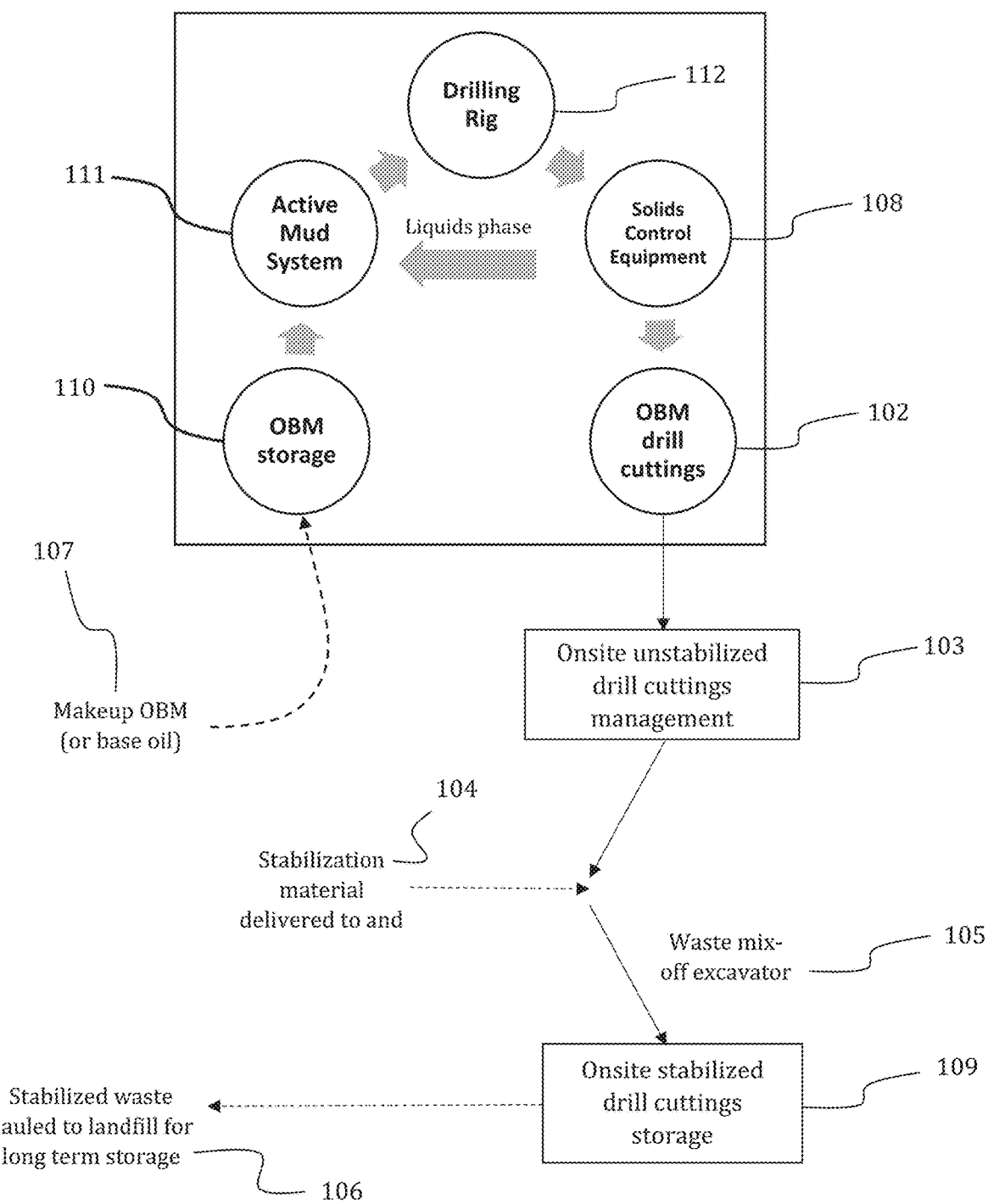
FIG. 1 demonstrates an embodiment of how a typical drilling rig manages fluids and solids operations onsite.

Residual drilling fluid or water on the drill cuttings waste is considered contamination and must be managed according to local or federal regulations. As illustrated in FIG. 1, the drill cuttings (from the shale shaker or other solids control equipment (108)) and low gravity solids underflow (102) (from the onsite decanter) are typically collected at the drill site in an onsite unstabilized drill cuttings management systems such as a three or four sided bins (103) and mixed with a stabilizing agent, for example sawdust or liquids absorbing pellets, to absorb the free leachable fluids and the stabilization material delivered to and stored at the site (104). The mix off is typically done by means of a wheeled loader or track excavator (105). The stabilized drill cuttings waste can then be transported safely using conventional transport methods, such as sealed end dump trailers. The stabilized drill cuttings waste is stored (109) and transported to specially designed landfills (106) featuring leachate collection systems and impervious liners. Landfills are built for long term storage. Makeup base oil or OBM is transported to the site (107) to cover the OBM losses resulting from the mix off process. The OBM is stored at the site (110) for use in the active mud system (111) for the drilling rig (112).

Figure 2:
FIG. 2 is a picture of unstabilized drill cuttings, stabilizing (or bulking) agent, and stabilized drill cuttings (ready for storage in a landfill) respectively.

From left to right, FIG. 2 is offered to demonstrate the OBM contaminated drill cuttings waste in a natural state (201), post treatment of a drilling rig shale shaker. The center picture (202) is that of a stabilizing (or bulking) agent, and picture on the right (203) shows the stabilized drill cuttings (ready for storage in a landfill).

Efforts to recover OBM drilling fluid from drill cuttings waste are continually being researched in an effort to find a process that balances clean drill cuttings waste with a processing cost less than or equal to the cost of the OBM drilling fluid. The quality of the recovered OBM (or base oil) is also an important consideration, if not critical to re-marketing efforts.

For example, U.S. Pat. No. 5,090,498 describes an onsite process wherein water or oil is used as a wash medium to wash the oil contaminated drill cuttings in a series of washing tanks. As the solids phase separates in the wash tanks, a pump conveys the slurry from each wash tank to a centrifuge for maximum liquids phase removal. The "cleaned" drill cuttings are then moved to a low temperature thermal processor which operates at a temperature setting of less than 200° C., in accordance with offshore drilling regulations. The process itself is complex and not well suited for tight shale drilling of the 21$^{st}$ century. Tight shale's are essentially compacted clays and by drilling the shale and transporting it up the wellbore, while removing the pressure of the earth causes substantial particle degradation. Essentially the clays have a seemingly infinite surface area, making separation of hydrocarbons and low gravity solids in a wash medium uneconomical, due to the particle settling velocity. Such is further exacerbated by the presence of water as the wash medium. Clays are naturally hydrophilic and the presence of water as the wash medium causes the clays to swell through the absorption of more water, decreasing the bulk density of the solids phase.

U.S. Pat. No. 4,139,462 describes an onsite process wherein as the oil contaminated drill cuttings waste is passed over a conventional rig shale shaker, the drill cuttings are subjected to a low pressure diesel wash process to remove excess oil base mud from the drill cuttings. The rig shale shaker is effectively equipped with a low-tech spray bar to facilitate a wash process as the drill cuttings travel over the vibratory screen deck. A centripetal solids separation process could also be used to further reduce the volume of liquids on the drill cuttings, prior to a thermal process being employed to remove the residual hydrocarbons still remaining on the drill cuttings. The thermal process must be performed within an inert atmosphere because of the possibility of fire or explosion. While the embodiment is likely to achieve high, if not complete separation of the hydrocarbons from the drill cuttings waste, the process is very inefficient when compared to more modern Low Temperature Thermal processors and does not reflect modern health and safety standards. For example, the use of diesel fuel as a drilling fluid has been banned by some regulatory bodies, due to volatiles that are often present in diesel fuel. The use of a diesel spray bar would cause additional volatiles to become airborne around the shale shaker area, due to the vibratory action of the screen deck which is in an area frequented by workers and likely to cause a significant health or safety risk. The embodiment is also unpractical because to centrifuge drilling mud at an ambient temperature of 25° C., the viscosity of a recovered oil base liquids phase would be at or near 2.5 centistokes, which is not sufficiently low enough to achieve a significant liquids phase reduction from the solids phase. Thus, the thermal process would still be required to remove most of the liquids phase.

Another example of an oil recovery process is called an Oil Recovery Unit (ORU) and described in U.S. Pat. Nos. 8,287,441 and 8,668,634. These patents detail a process where unstabilized OBM drill cuttings are collected from a conventional shale shaker and conveyed into a horizontal decanter centrifuge. Specifically, an auger delivers the "wet" drill cuttings into the horizontal decanter that is designed to accept heavy, (greater than 50%) solids laden material. The material spills from the auger delivery system and falls into the big bowl decanter which is spinning at such a rate that the drill cuttings are subjected to substantial centripetal forces, for example, 1,000 to 2,000 g-forces. This force causes the heavier solids to settle along the inner wall of the bowl while the liquids phase leaches into the pond section of the horizontal decanter. The solids phase is conveyed to the conical end where it moves up the beach of the centrifuge and is ejected from the bowl section via wear resistant ports. The technology is at least partially effective at removing free liquids on drill cuttings waste, generally achieving a residual liquids of 20% to 50% (by volume), and as low as 10% residual liquids (by volume). The liquids phase flows in the opposite direction from which the solids are conveyed, and is collected at the opposite end of the bowl where the liquids phase spills over the weirs of the bowl section. This method of separating the liquids phase and solids phase is unique in that the bowl allows for both a significant removal of the OBM drilling fluid from the drill cuttings and could also achieve a simultaneous reduction of low gravity solids from the liquids phase, which can be as little as approximately 5% solids (by volume).

While the Oil Recovery Unit is capable of reclaiming more oil base mud than conventional shale shakers alone, it has several drawbacks including:

1) The equipment described is very expensive and require one or more onsite operators be present to monitor the equipment when in operation. Given that a drilling rig typically only uses OBM for two weeks of a typical four week well, means that the technology can only be utilized for 50% of the time, while sitting idle the other 50% of the time.

2) For the equipment described to function at its greatest potential, additional heat energy is required, to alter the viscosity of the liquids phase, which is contaminating the drill cuttings. Ideally, the process should maintain a minimum feed temperature of approximately 50° C., which means additional power must be used for the process to function at its greatest potential. Given drilling rigs are always operating in remote areas and otherwise do not have access to grid electricity, diesel powered generators must typically be used to supply the required electric energy. To quantify the significance of the heat energy input, one must consider the fact that it takes 1837 BTU's to raise the temperature of 1 m3 (cubic meter) of unstabilized drill cuttings containing 30% hydrocarbons (by volume) and 5% water (by volume), by 1° C. this presumes there is no loss of heat energy due to inefficiencies in the design.

3) As mentioned, the technology can reclaim more oil base mud than conventional shale shakers, but the drill cuttings still contain residual liquids of approximately 20% to 50% (by volume), and as low as 10% residual liquids (by volume). Given the residual contamination is still high enough to emit a distinct odor of hydrocarbons, and the residual contamination is still visually obvious, the marketability of such a technology as 'environmentally advantageous' is extremely limited.

4) Issues also exist relating to gearbox sizing. Generally, decanter centrifuges are designed to process a slurry with a solids phase of less than 20% (by volume). Dewatering a heavy solids phase is limited by torque in the gear box and subsequently, the technology described in U.S. Pat. No. 8,287,441 and U.S. Pat. No. 8,668,634 is unable to keep up with fast hole drilling where greater than five cubic meters of oil based drilling mud contaminated drill cuttings are generated each hour.

Centripetal cuttings separators which employ greater than 400 gravitational forces are at least partially effective at removing free liquids on drill cuttings waste, generally achieving a residual liquids of 10% to 25% (by weight), and as low as 5% liquids (by weight). However, the recovered oil from a centripetal cuttings separator is typically very high in low gravity drilled solids for example, conventional centripetal cuttings separators (as described in International Publication Number WO 03/102359 and U.S. Pat. No. 5,256,289, the disclosures of which are herein incorporated by reference) to remove up to about 50% (by volume) of the recoverable hydrocarbons and/or water content present as a liquids phase on the solids phase would work in conjunction with another form of OBM drill cuttings treatment, effectively pre-drying the drill cuttings waste prior to employing a secondary form of treatment (see also, for example, commonly assigned, copending U.S. patent application Ser. No. 62/212,754, the disclosure of which is herein incorporated by reference in its entirety).

Thermal processors have been used to remove hydrocarbon contamination from materials in the past, for example drill cuttings waste contaminated with OBM. This technology is known to be effective, heating the contaminated soil material to the point where the water and hydrocarbons evaporate. The hydrocarbon material is then typically recondensed using a condenser to remove the heat energy from the hydrocarbon vapor and recapture it in a vessel as a liquid, typically making it also available for reuse.

Low Temperature Thermal (LTT) technology is considered to be very energy efficient (when compared to other thermal evaporators, for example) because the energy loss can be negligible. Thermtec AS manufactures an LTT processor, commonly known as a Thermomechanical Cuttings Cleaner (TCC), or Hammermill processor. The TCC processor uses a drive unit to rotate a shaft with wear-resistant paddles to hammer the waste, converting kinetic energy to heat energy. The friction is created as the OBM contaminated drill cuttings waste is conveyed to the inside surface of the stationary outer wall of the reactor. There, high-speed wear-resistant paddles are rotating with close clearance to the reactor wall. The solids within the drill cuttings waste become caught up and broken by the tight clearances between the high speed rotating paddles and the reactor wall. The friction causes the drill cuttings waste to become heated to the point where fluids flash evaporate. The water first vaporizes as steam (further heating the hydrocarbons), followed by the hydrocarbons, leaving the solids phase in the reactor until the solids are ejected from the process thereafter. The vapor, comprised of water, hydrocarbons (and dust) is moved through one or more heat exchangers to extract the heat energy wherein water, hydrocarbons (and dust) are collected. It should be noted that while LTT is a technology which evaporates the target base oil, any and all constituents which have the same boiling point, or a lower boiling point than the base oil, are also forced to vaporize and thereafter become part of the recondensed liquids phase. As such, LTT is unable to separate undesired constituents which can include BTEX or volatiles containing fewer than nine carbon atoms per molecule.

While drill cuttings waste contaminated with more OBM typically represents the opportunity for more recoverable oil, which is clearly better from an economic standpoint, the wetter the cuttings, the slower the TCC processor needs to be run, and/or recovered cuttings cleanliness is sacrificed.

Efficient and effective use of LTT technology is reduced if not eliminated altogether when large amounts of water are present in the drill cuttings waste, or the ratio of liquids to solids phase unexpectedly changes. For example, OBM typically has an emulsified water component, however, additional water accumulations from rain or snowfall, or pressure washers at the drill site, require additional heat energy to remove the water phase before the oil phase can be harvested in the LTT technology (or alternatively, the process to be operated slower). For example, the TCC processor consumes greater than 500 kilowatts of electric (or equivalent mechanical) energy, per volumetric cube of OBM contaminated drill cuttings with an approximate composition of 70% solids, 15% water, 15% oil (by weight). Interestingly, more than two thirds of the energy consumption is absorbed by the liquids phase transitioning to a vapor and typically, the water phase consumes three times as much energy as the oil phase. Thus, to employ a centripetal cuttings dryer as a form of pretreatment to LTT would be highly advantageous, from both an efficiency and economic standpoint.

Thus is the need for an improved method to clean OBM contaminated drill cuttings and reuse the oil as drilling fluid. As described herein, is to utilize high gravity centripetal separator to effectively remove at least a portion of the free liquids including water and OBM from the drill cuttings waste, prior to employing the use of a LTT processor, to achieve a 25%, or 50%, or 100% greater volumetric throughput of the LTT processor; or, lower overall power consumption by greater than 25% (on a volumetric or weight measurement of LTT feed), while not losing the benefit of recovering a substantial portion of the hydrocarbons present in the drill cuttings waste, or sacrificing the maximum volumetric throughput of the LTT process. In a further description of the embodiment, the addition of heat energy to the process to more effectively recover liquids with a centripetal cuttings separator, or remove volatiles for a better quality recovered base oil or drilling fluid, or increase the LTT processor throughput, or lower the overall cost of power consumption by utilizing natural gas heat instead of (or in addition to) electric or mechanical energy, or increase the effectiveness of LGS's removal within conventional stripping equipment is also described, any of which are highly desired outcomes.

As shown in the flowchart of FIG. 3, in one typical process as described herein, drill cuttings waste is produced by a drilling rig (301) drilling an oil or gas well with OBM while not stabilizing the drill cuttings waste with a bulking agent. The first unstabilized OBM drill cuttings waste is received at a facility and stored in at least partially covered tanks (302) to restrict altogether, or mitigate precipitation from settling on the drill cuttings waste, prior to the embodiment disclosed herein being employed. The first unstabilized OBM drill cuttings waste (301) is then processed through a high gravity centripetal separator (303) to remove otherwise leachable free liquids including hydrocarbons and/or water thereby producing a second pre-dried solids phase (304) with substantially less liquids and a third liquids phase (305) with less solids.

The process in the high gravity centripetal cuttings separator is typically operated to achieve a maximum dryness of the second solids phase, as opposed to a greater liquids clarity of the third liquids phase. It can also be run to achieve a minimum amount of solids in the third liquids phase, as opposed to a minimum amount of liquid in the solids phase. Generally as a rule, a drier cake or a clearer liquid can be generated, or somewhere in between, but typically both cannot be attained. Also, as the well gets deeper, the cuttings wetness goes from dryer (less OBM contamination on the cuttings) to wetter (more OBM contamination on the cuttings), i.e., cuttings that travel e.g. 1000 meters vertically don't get beat up while traveling up the well bore and thus, they are larger and have less surface area for OBM to contaminate. Cuttings that are traveling e.g. 4000 meters through first a horizontal portion of the well are badly degraded into fine sand sized particles when they reach surface, thereby having more surface area and more OBM contamination.

A high gravity centripetal cuttings separator can include for example, an enhanced horizontal decanter centrifuge as described herein or vertical cuttings dryer either of which are acceptable, provided the technique employs greater than 400 gravitational forces. The high gravity centripetal separator takes a first unstabilized drill cuttings phase and produces a second solids phase (304) containing less than 10% hydrocarbons (by weight) and a third liquids phase (305) containing LGS's, which is conveyed into a LTT processor (307) wherein the temperature is sufficient to evaporate hydrocarbons and/or water, and the fourth vapor phase is recondensed in a condenser (308) as a fifth liquid phase (309) and collected in separate vessel which is operatively connected to the LTT process. The recovered liquids phase can be sold for reuse, or disposed of as a contaminant. The sixth solids phase (310) with substantially no liquids phase is sent to landfill disposal or storage for reuse, or blended with the second solids phase to create a less contaminated seventh solids phase (306) and sent to landfill for disposal or storage for reuse.

Less viscous fluids are more likely to become mobilized when even moderate gravitational forces (for example, greater than 100 gravity forces) are exerted on them. While not illustrated on FIG. 3, a minimum temperature of 20° C. could be maintained with the first unstabilized OBM drill cuttings feed prior to conveying the first feed into a high gravity centripetal separator. Such could be accomplished by applying even small amounts of gas fired heat energy to the storage tank (302) or recycling heat energy from the low temperature thermal process.

Alternatively, another configuration of the embodiment describes a process wherein additional heat energy can be applied to the drill cuttings to remove at least a portion of water, BTEX, or other undesired volatiles, prior to employing the high gravity centripetal separator and LTT process, in an effort to maximize the efficiency of the LTT process throughput and quality of recovered base oil.

Specifically, the high gravity centripetal separator is capable of removing a portion of the liquids phase contamination from the OBM drill cuttings. The liquids phase is held on the solids phase, or the solids phase is held within the liquids phase, or both, and thus, recovery of the liquids phase is only capable when higher gravitational forces are applied, for example, 400 gravitational forces or more. The higher gravitational forces cause the (Bingham Plastic) liquids phase to yield under the stress of gravity and the liquids phase gains temporary mobility (it behaves more like a liquid than a solid), giving it the ability to be separated from the solids phase. An alternate or enhanced method of reducing the viscosity of the liquids phase contaminating the solids phase is to increase the temperature of the liquids phase. FIG. 6 illustrates the effects on light oil (for example diesel fuel) viscosity as the temperature increases. To increase the temperature of the unstabilized drill cuttings feed from the ambient temperature (which can be as cold as −40° C. in some parts of North America) to greater than 100° C. (in a controlled process environment) would reduce the viscosity from greater than 35 to less than 1.0, which is advantageous when the desired outcome is to separate viscous liquid from solids or solids from viscous liquid.

FIG. 4 describes this alternate version of the embodiment wherein drill cuttings waste is produced by a drilling rig, drilling an oil or gas well with OBM for example, while not stabilizing the drill cuttings waste (401) with a bulking agent. The first unstabilized OBM drill cuttings waste is received at a facility and stored in at least partially covered tanks (402) to restrict altogether, or mitigate precipitation from settling on the drill cuttings waste, prior to the embodiment disclosed herein being employed. The first unstabilized OBM drill cuttings waste (401) is then conveyed into a liquid tight heating tank (403) wherein the drill cuttings waste is exposed to a hot (greater than 50° C. and preferably greater than 80° C. and more preferably greater than 100° C., but generally less than 150° C.) conveyor or oil bath so that at least a portion of the free water, BTEX and volatiles are forced to vaporize as the ninth phase (404) and exit the heating tank (403) by means of hermetically sealed conduit (not shown) where it enters a condenser (405) and subsequently recovered as the twelfth liquids phase (406). The twelfth liquids phase can be disposed of by means of an injection well (not shown), mixed with the sixth solids phase (421), or other suitable disposal method, or (in the case of volatile hydrocarbons) reused as fuel, or (in the case of water) at least partially reused in oil base mud. The heat energy used in the heating tank is supplied by a process heater (407) which is typically powered by less expensive natural gas. The heat transfer fluid (409) is pumped to the heating tank (403) and at least a portion of the heat energy is absorbed by the water, BTEX and undesired volatiles, which leaves the heating tank as a vapor (404). The cooler heat transfer fluid recirculates out of the heating tank, back (408) to the process heater (407) within a closed loop.

If in the case of a hot oil bath, the oil bath fluid should be similar in composition as that of the base oil commonly used in OBM, because some of the hot oil bath fluid will be conveyed out of the heating tank with the OBM contaminated drill cuttings, and some of the OBM that becomes liberated by the low viscosity environment will come to be mixed with the hot oil bath fluid. The composition of the hot oil bath will over time, come to match that of the base oil or blend of base oils, used in the OBM. Thus, oil selected for the hot oil bath fluid should contain 10 to 30 carbon atoms per molecule or 10 to 25 carbon atoms per molecule, or ideally, 11 to 20 carbon atoms per molecule.

While a hot oil bath would provide an excellent heat transfer means, the design of the heating tank is of less concern to the embodiment, other than to ensure the heat transfer means has sufficient capability to maintain the desired drill cuttings feed throughput and operational temperature. Thus, as an alternative design of the heating tank (403), a conveyor within a jacketed trough filled with heat transfer fluid, or holo-flite auger heated with a heat transfer fluid, can be used to facilitate the heat transfer and cause less desired portions (such as water, BTEX and volatiles-discussed below) of the OBM to vaporize and leave the heating tank.

As previously mentioned, the OBM or drill cuttings waste can be contaminated with naturally occurring formation fluids which can contain a volatile constituents with fewer than nine carbon atoms per molecule, most importantly, BTEX. BTEX is an acronym for benzene, toluene, ethylbenzene, and xylene, all of which are known to cause adverse health effects to humans. Further, as demonstrated in Table 1, each of the BTEX constituents also have moderately low (closed cup) flash points and can negatively affect the safe working parameters of the OBM by lowering the flash point of the OBM. Some regulatory bodies require OBM to have a flash point of greater than 60° C. while some operators require the flash point to be either that imposed by regulators, or 10° C. higher than the flow line temperature of the OBM in the active mud system, whichever is greater. Thus, to lower the flash point of the OBM by permitting BTEX to accumulate in the active mud system would almost certainly lower the flash point of the OBM while unduly exposing workers to hazardous volatile constituents. Interestingly, three of the four BTEX constituents are known to form an azeotrope with water which means when water is present, the constituent boils in unison with water, at a lower boiling temperature than either water or itself in pure (or substantially pure) form.

TABLE 1

| Solvent (BTEX) | Closed cup Flash Point Celsius | Viscosity (cP @ 20 C.) | Specific Gravity | Vapor Pressure (Torr @ 20 C.) | Boiling Point (Celsius) | Azeotrope boiling point (with water) |
|---|---|---|---|---|---|---|
| Benzene | −11 | .6 | .874 | 95 | 78 | |
| Toluene | 45 | .57 | .871 | 28.5 | 230 | 83 C. |
| Ethylbenzene | 22 | .67 | .8665 | 254 | 136 | 93 C. |

TABLE 1-continued

| Solvent (BTEX) | Closed cup Flash Point Celsius | Viscosity (cP @ 20 C.) | Specific Gravity | Vapor Pressure (Torr @ 20 C.) | Boiling Point (Celsius) | Azeotrope boiling point (with water) |
|---|---|---|---|---|---|---|
| Xylene | 83 | .62 | .865 | 6 | 280 | 93 C. |
| Water | | .89 | 1 | 17.54 | 100 | |

While BTEX is known to cause adverse health concerns to humans, it's important to note that all low flash point volatile constituents (for example, liquids containing five to nine carbon atoms) will have an adverse effect on the quality of the recovered oil phase by reducing the flash point and if possible, should be removed.

Thus, as the first unstabilized OBM drill cuttings waste (401) is conveyed into a liquid tight/vapor tight heating tank (403), the drill cuttings waste is exposed to a heating tank comprised of either a heating conveyor or hot oil bath (heated to a temperature of greater than 50° C. and generally less than 150° C.) so that both free water and BTEX are forced to vaporize and leave the heating tank (403) by means of hermetically sealed conduit (not shown) where the vapor phase enters a condenser (405) for heat extraction and subsequent liquids (water and/or BTEX and/or volatiles containing fewer than nine carbon atoms per molecule) recovery (406). FIG. 7 illustrates the normal boiling point ranges of common distillate and synthetic base oils, commonly used as the base fluid in OBM. As illustrated, a heating tank which is heating the OBM contaminated drill cuttings feed to greater than 50° C. and typically greater than 80° C. and more typically greater than 100° C., but generally less than 150° C. would not negatively affect the makeup of common base oils, yet would generally be sufficient to evaporate undesired constituents such as benzene (at 78° C.), the azeotrope of toluene/water (at 83° C.), the azeotrope of ethylbenzene/water (at 93° C.), the azeotrope of xylene/water (at 93° C.), and excess water (at 100° C.), and/or volatiles containing fewer than nine carbon atoms per molecule that was not intended to be a portion of the OBM.

If in the case of an oil bath heating tank, the oil contaminated drill cuttings are conveyed from the heating tank by means of an auger (not shown) along the bottom of the heating tank, as a eight feed phase of hot OBM contaminated drill cuttings. Optionally, in an effort to ensure the eight feed phase is predictably consistent with the ratio of liquids to solids, a pump could remove the slurry from the heating tank and deliver it to a secondary shale shaker (not shown) inline of the eight feed phase, before the eight feed phase is conveyed into the centripetal cuttings separator (410). The liquids phase from the shale shaker (not shown) is returned to the heating tank in a closed loop. As previously discussed, FIG. 5 illustrates the reduction in viscosity of a diesel oil, specifically the drop in viscosity when the oil exceeds 100° C. The centripetal cuttings dryer is setup and operated to achieve maximum liquids clarity as opposed to maximum liquids recovery. In a further benefit of the embodiment, it is expected that the second solids phase will become substantially dryer (containing less liquids phase) and the third liquids phase weigh substantially less (containing less solids) because of the reduced viscosity of the liquids phase contaminating the drill cuttings, due to the higher temperature of the drill cuttings feed going to the centripetal cuttings dryer.

Once the high gravity centripetal separator (410) has removed a substantial portion of the otherwise leachable free liquids including hydrocarbons and/or water thereby producing a second pre-dried solids phase (411) with substantially less liquids and a third liquids phase (412) with less solids, the second solids phase (411) is conveyed into an operatively connected LTT processor (413) wherein the temperature is sufficient to evaporate residual hydrocarbons and/or water (if present), creating a fourth vapor phase that is recondensed in a condenser (414) as a fifth liquid phase (415) and collected in separate vessel (not shown) which is operatively connected to the LTT process (413). The recovered fifth liquids phase can be sold for reuse as a drilling fluid or used as a source of energy. The seventh solids phase (416) with substantially no liquids phase is sent to landfill disposal or storage for reuse. The third liquids phase (412) with less solids is treated by means of a conventional stripping process (417) which can include horizontal decanter(s) and/or disc centrifuges and/or membranes to remove sufficient amounts of LGS's or water to make the recovered tenth OBM phase (418) suitable for reuse or, mixed with the fifth liquids phase (415) to create a blended eleventh liquids phase (419) with a substantially diluted LGS's phase (for example, less than 1% LGS's), suitable for reuse as a drilling fluid. The thirteenth solids phase (420) from the conventional stripping process (417) is also sent to the LTT processor (413) for liquids recovery. Not only does the embodiment improve the efficiency and effectiveness of the LTT technology by creating a consistency in feed material (which is not typically available on a drill site), but also by directing only solids with substantially lower liquids contamination than that of unstabilized drill cuttings (401) so that the LTT technology is not slowed by the additional liquids contamination. Additionally, the effectiveness and efficiency of the centripetal cuttings separators in this environment is improved as well because of the reduced viscosity of the hot OBM liquids phase contaminating the drill cuttings, and the recovered base oil and OBM will have improved characteristics like that of new base oil because of water and volatile stripping in the heating tank. Further, degradation of the OBM contaminated drill cuttings caused by conveying, heating and high gravity centripetal extraction does not cause a processing concern for the LTT process because the drill cuttings particles are ultimately ground up by the mechanical operation of the TCC processor. Further, the addition of heat energy at the start of the embodiment is not lost to the process of recovering the hydrocarbons phase because the addition of less expensive natural gas heat energy mitigates the need for additional electric or mechanical kinetic-to-heat energy in the LTT process, induced by the friction of the high speed rotating paddles.

The processes described herein stresses the importance of recovering a quality base oil or quality oil base mud for reuse. An additional (and less costly) option to the processes illustrated in FIG. 3 and FIG. 4, is illustrated in FIG. 5, demonstrating a process where the same components can be reconfigured while removing the most expensive capital cost item being, the LTT equipment. FIG. 5 illustrates that the first unstabilized OBM drill cuttings waste (502) is received at a facility after being shipped from the waste generators drill site (501). The waste is then conveyed into a liquid tight heating tank (503) wherein the drill cuttings waste is exposed to a hot (greater than 50° C. and preferably greater than 80° C. and more preferably greater than 100° C., but generally less than 150° C.) conveyor or oil bath so that (a portion of the) free water, BTEX and volatiles are forced to vaporize as the ninth phase (504) and exit the heating tank (503) by means of hermetically sealed conduit (not shown) where it enters a condenser (505) and subsequently recovered as the twelfth liquids phase (506). The twelfth liquids phase can be disposed of by means of an injection well (not shown), mixed with the second solids phase (511), or other suitable disposal method, or (in the case of volatile hydrocarbons) reused as fuel, or (in the case of water) at least partially reused in oil base mud. The heat energy used in the heating tank (503) is supplied by a process heater (507) which is typically powered by less expensive natural gas. The heat transfer fluid (509) is pumped to the heating tank (503) and at least a portion of the heat energy is absorbed by the water, BTEX and undesired volatiles, which leaves the heating tank as a vapor (504). The cooler heat transfer fluid recirculates out of the heating tank, back (508) to the process heater (507) within a closed loop.

The eight feed phase is conveyed into the centripetal cuttings separator (510) which is operated to achieve maximum liquids recovery as opposed to maximum liquids clarity. In a further benefit of this embodiment, it is expected that the second solids phase will become substantially dryer (containing less liquids phase) and the third liquids phase weigh substantially less (containing less solids) because of the reduced viscosity of the liquids phase contaminating the drill cuttings, due to the higher temperature of the drill cuttings feed going to the centripetal cuttings dryer.

Once the high gravity centripetal separator (510) has removed a substantial portion of the otherwise leachable free liquids including hydrocarbons and/or water thereby producing a second pre-dried solids phase (511) with substantially less liquids, and a third liquids phase (512) with less solids, the second solids phase (511) is sent to a landfill for final disposition, or sent to a staging area for solids reuse. The third liquids phase (512) with less solids is treated by means of a conventional stripping process (517) which can include horizontal decanter(s) and/or disc centrifuges and/or membranes to remove sufficient amounts of LGS's or water to make the recovered tenth OBM phase (518) with a substantially lower LGS's phase (for example, less than 1% LGS's), suitable for reuse as a drilling fluid, or used as a source of energy. Note also the seventh phase (516), the eleventh phase (519), and the thirteenth phase (520) also demonstrated in the figure.

While the condenser (308, 405, 414 or 505) described herein would typically consist of a fin-fan or radiator to displace the heat energy of the vapor phase, the condenser can consist of a shell and tube or plate and frame or other suitable heat exchanger, capable of recovering the lost heat from the condenser and reusing it within the process of heating the drilling waste storage tank (302 or 402 or 502), or in-line of the return line (408 or 508) from the heating tank, or supplemental heat to what is also provided by the process heater (407 or 507).

As described herein, these problems and others in this area are addressed with the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for removing hydrocarbon and water contamination from a first phase oil base mud contaminated drill cuttings containing liquids and solids, and recovering liquids in a multi-stage separation process, comprising placing the first phase oil base mud contaminated drill cuttings in a container and managing the flow of the first phase oil base mud contaminated drill cuttings into and out of the container to a substantially consistent ratio of liquids phase to solids phase;

conveying the first phase oil base mud drill cuttings into a centripetal cuttings separator to create a second solids phase with less water and hydrocarbon contamination and a third liquids phase with an approximately equal ratio of liquids to solids;

conveying the said third liquids phase with an approximately equal ratio of liquids to solids into a thermal process utilizing stationary reactor walls and rotating paddles, the solids in the third phase causing friction between the stationary reactor walls and rotating paddles of the thermal process, and the friction generating heat energy causing evaporation of the liquids portion of the third phase into a fourth vapor phase and a sixth solids phase;

condensing the fourth vapor phase into a fifth liquid phase comprising water and/or hydrocarbons, and collecting the fifth liquid phase; and, mixing the sixth solids phase with the second solids phase to form a seventh mixed solids phase;

resulting in enhanced liquids and solids recovery.

2. The process of claim 1 wherein the centripetal cuttings separator exerts greater than 400 gravitational forces on the oil base mud contaminated drill cuttings waste.

3. The process of claim 1 wherein the centripetal cuttings separator exerts greater than 1000 gravitational forces on the oil base mud contaminated drill cuttings waste.

4. The process of claim 1 wherein the centripetal cuttings separator is operated to obtain maximum dryness of the second solids phase.

5. The process of claim 1 wherein the first phase oil base mud contaminated drill cuttings is heated to a temperature of at least 20° C. at 0 PSIG.

6. The process of claim 5 wherein the heating is provided by natural gas or recycled heat energy from the condensing of the fourth vapor phase.

7. The process of claim 1 wherein the centripetal cuttings separator removes greater than 50% by volume of the liquids phase from the first oil base mud contaminated drill cuttings phase.

8. The process of claim 7 wherein the liquids phase comprises at least free water, hydrocarbons, and/or emulsified water.

9. The process of claim 1 wherein the enhanced liquids and solids recovery includes an increase of drill cuttings waste throughput of the thermal process by greater than 25% and/or cleaner solids recovery.

10. The process of claim 1 wherein the enhanced liquids and solids recovery includes an increase of drill cuttings waste throughput of the thermal process by greater than 50% and/or cleaner solids- containing less hydrocarbon contamination.

11. The process of claim 1 wherein the enhanced liquids and solids recovery includes an increase of drill cuttings waste throughput of the thermal process by up to 100% and/or cleaner solids recovery.

* * * * *